(12) United States Patent
Chen

(10) Patent No.: US 11,017,649 B1
(45) Date of Patent: May 25, 2021

(54) DYNAMIC ALARM PRIORITY SYSTEM AND METHOD

(71) Applicant: Climax Technology Co., Ltd., Taipei (TW)

(72) Inventor: Yi-Kai Chen, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 0 days.

(21) Appl. No.: 17/001,004

(22) Filed: Aug. 24, 2020

(51) Int. Cl.
| | |
|---|---|
| *H04N 7/18* | (2006.01) |
| *G08B 19/00* | (2006.01) |
| *G06K 9/00* | (2006.01) |
| *H04N 5/247* | (2006.01) |

(52) U.S. Cl.
CPC ......... *G08B 19/00* (2013.01); *G06K 9/00771* (2013.01); *H04N 5/247* (2013.01); *H04N 7/181* (2013.01); *H04N 7/188* (2013.01)

(58) Field of Classification Search
CPC .... G06K 9/00771; G08B 19/00; H04N 5/247; H04N 7/181; H04N 7/188
See application file for complete search history.

(56) References Cited

U.S. PATENT DOCUMENTS

| | | | | |
|---|---|---|---|---|
| 5,289,275 A * | 2/1994 | Ishii | .................... | G06K 9/00362 340/578 |
| 6,353,385 B1 | 3/2002 | Molini et al. | | |
| 7,542,585 B2 * | 6/2009 | Chen | .................... | G08B 17/125 348/143 |
| 7,864,983 B2 * | 1/2011 | Dronge | ................ | G08B 13/194 382/107 |
| 9,906,722 B1 * | 2/2018 | Gigot | ............... | H04N 5/232411 |
| 2007/0169151 A1 * | 7/2007 | Vishloff | ................. | H01Q 1/246 725/62 |
| 2009/0022362 A1 * | 1/2009 | Gagvani | ............ | G06K 9/00718 382/100 |
| 2010/0245087 A1 * | 9/2010 | Gerner | ..................... | G07C 9/28 340/541 |

(Continued)

FOREIGN PATENT DOCUMENTS

EP 2492883 A1 8/2012

OTHER PUBLICATIONS

Extended European Search Report dated Feb. 26, 2021 in related European Application No. 201941174.6.

*Primary Examiner* — Peet Dhillon
(74) *Attorney, Agent, or Firm* — Donald E. Stout; Stout, Uxa & Buyan, LLP

(57) ABSTRACT

A dynamic alarm priority system includes plural kinds of alarm devices, an alarm signal being generated when the alarm device is triggered; a plurality of image capture devices, correspondingly coupled to the alarm devices respectively, the triggered alarm device activating the corresponding image capture device to capture an alarm image; an interface device that receives the alarm signal; an assignment device coupled to receive the alarm signals, which are assigned priorities in order of time, thereby generating an initial alarm signal sequence; and an object detection device that performs object detection on the alarm image to determine whether an associated object is detected in the alarm image. The assignment device dynamically modifies the initial alarm signal sequence according to an object detection result from the object detection device, thereby generating an updated alarm signal sequence.

13 Claims, 4 Drawing Sheets

(56) References Cited

U.S. PATENT DOCUMENTS

| | | | |
|---|---|---|---|
| 2018/0167591 A1* | 6/2018 | Maliuk | G06T 7/20 |
| 2018/0268674 A1* | 9/2018 | Siminoff | H04N 7/186 |
| 2019/0138512 A1* | 5/2019 | Pourmohammad | G05B 15/02 |
| 2019/0213212 A1* | 7/2019 | Adato | G07G 1/0036 |

* cited by examiner

DYNAMIC ALARM PRIORITY SYSTEM AND METHOD

BACKGROUND OF THE INVENTION

1. Field of the Invention

The present invention generally relates to an alarm system, and more particularly to a dynamical alarm priority system and method.

2. Description of Related Art

An alarm device gives an audible, visual or other form of alarm signals when triggered, which warns a user to do some actions for preventing or reducing danger. A burglar alarm and a fire alarm (such as smoke detector) are some common alarm devices.

The trigger threshold of the alarm device should be considered comprehensively. A miss alarm may occur if the trigger threshold is high, and, contrarily, a false alarm may occur if the trigger threshold is low. The false alarm may waste and bind resources, which cannot be utilized in an event of a true alarm.

The conventional alarm control center may usually monitor tens or even thousands of alarm devices distributed over a wide area. Therefore, the control center, in a period, may receive many alarm signals, which are given priorities and processed in order of time when the alarm signals are received. As false alarms are common, opportunity to process the true alarm will be lost.

A need has thus arisen to propose a novel scheme to overcome drawbacks of the conventional alarm system.

SUMMARY OF THE INVENTION

In view of the foregoing, it is an object of the embodiment of the present invention to provide a dynamic alarm priority system and method capable of dynamically adjusting priorities of alarm signals. Therefore, a true alarm may be processed first and a false alarm may be deferred, thereby substantially enhancing overall efficiency of the alarm system.

According to one embodiment, a dynamic alarm priority system includes plural kinds of alarm devices, a plurality of image capture devices, an interface device, an assignment device and an object detection device. An alarm signal is generated when the alarm device is triggered. The image capture devices are correspondingly coupled to the alarm devices respectively, the triggered alarm device activating the corresponding image capture device to capture an alarm image. The interface device receives the alarm signal. The assignment device is coupled to receive the alarm signals, which are assigned priorities in order of time, thereby generating an initial alarm signal sequence. The object detection device performs object detection on the alarm image to determine whether an associated object is detected in the alarm image. The assignment device dynamically modifies the initial alarm signal sequence according to an object detection result from the object detection device, thereby generating an updated alarm signal sequence.

DETAILED DESCRIPTION OF THE INVENTION

Figure 1:
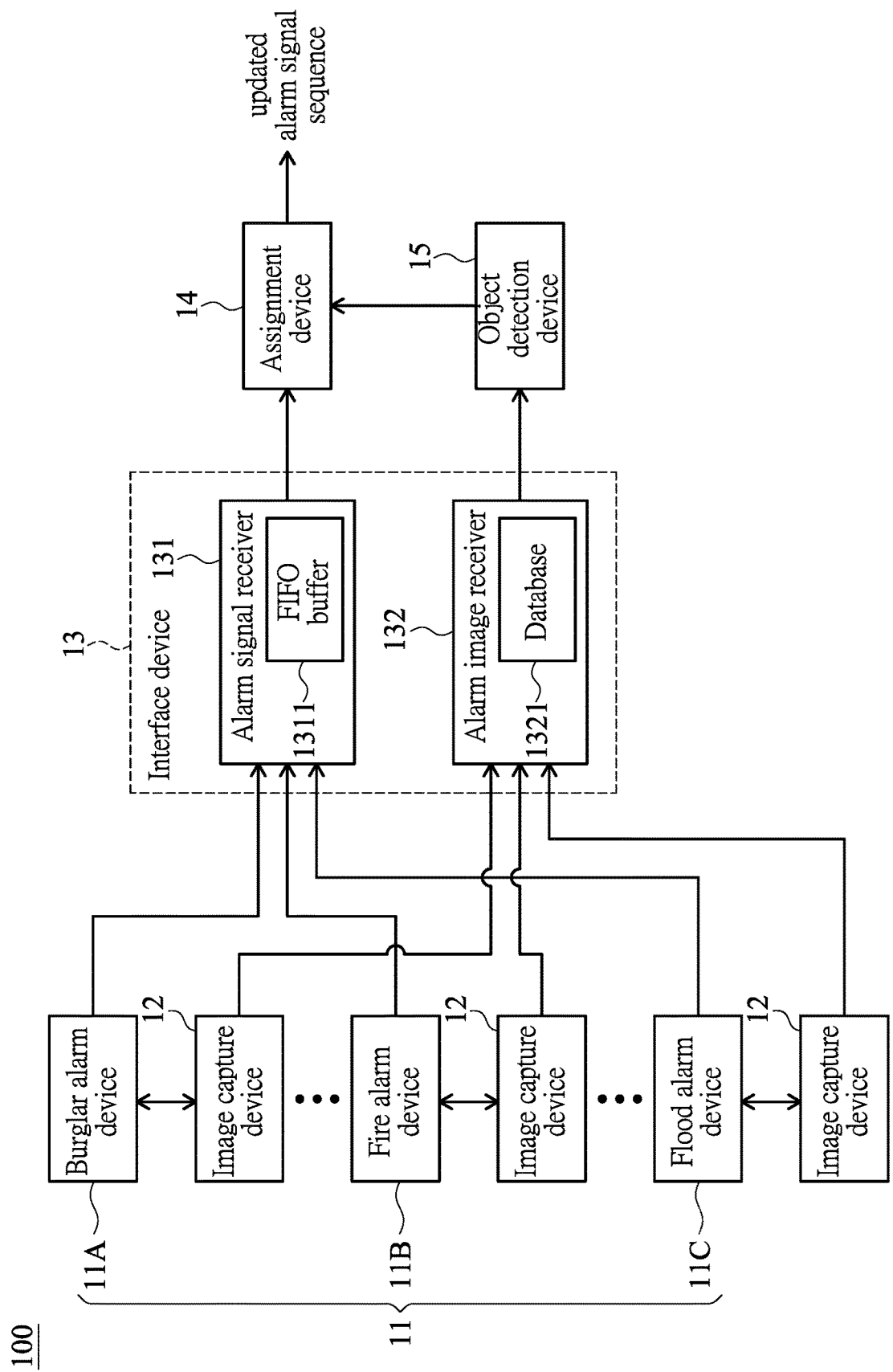
FIG. 1 shows a block diagram illustrating a dynamic alarm priority system according to one embodiment of the present invention.
Figure 2:
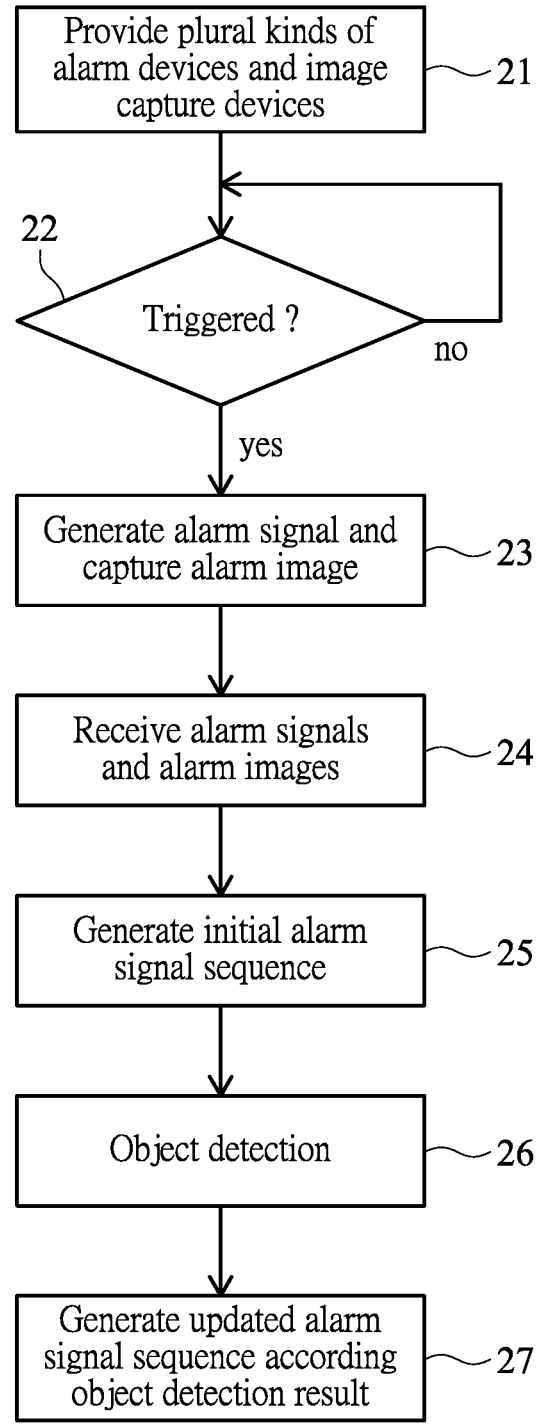
FIG. 2 shows a flow diagram illustrating a dynamic alarm priority method according to one embodiment of the present invention.

FIG. 1 shows a block diagram illustrating a dynamic alarm priority system 100 according to one embodiment of the present invention, and FIG. 2 shows a flow diagram illustrating a dynamic alarm priority method 200 according to one embodiment of the present invention. The dynamic alarm priority system (system hereinafter) 100 of FIG. 1 or the dynamic alarm priority method (method hereinafter) 200 of FIG. 2 may dynamically determine priorities of alarms.

As shown in FIG. 1, the system 100 may include plural kinds of alarm devices 11 (step 21). When the alarm device 11 is triggered or actuated (step 22), an alarm signal may be generated (step 23). In one embodiment, the alarm devices 11 may include (but not exclusively) burglar alarm devices 11A, fire alarm devices 11B and flood alarm devices 11C.

In the embodiment, the system 100 may include image capture devices 12 (step 21) such as still cameras or video cameras. The image capture devices 12 may be correspondingly coupled (in wired or wireless manner) to the alarm devices 11, respectively. When the alarm device 11 is triggered (step 22), the triggered alarm device 11 may activate a corresponding image capture device 12 to capture an alarm image or video (step 23). In one embodiment, some alarm devices 11 have no corresponding image capture deices 12.

In the embodiment, the system 100 may include a (communication) interface device 13, which may include an alarm signal receiver 131 and an alarm image receiver 132, which are configured to receive the alarm signal (from the alarm device 11) and the alarm image (from the image capture device 12), respectively (step 24). It is noted that the alarm signal and the corresponding alarm image may have the same event identification (ID). In one embodiment, the interface device 13 may be disposed in a control center (e.g., central monitor system or CMS) of an alarm system.

In one embodiment, the alarm signal receiver 131 may include a first-in-first-out (FIFO) buffer 1311 for storing the received alarm signals. The alarm image receiver 132 may include a database 1321 for storing the received alarm images. It is noted that the alarm image receiver 132 may receive the alarm image in a wired or wireless manner. Moreover, the alarm image receiver 132 may receive the alarm image directly from the image capture device 112, or may receive the alarm image indirectly from the image capture device 12, for example, via the Internet.

The system 100 of the embodiment may include an assignment device 14 (for example, disposed in the control center) coupled to receive the alarm signals from the alarm signal receiver 131 (of the interface device 13), and the received alarm signals are assigned priorities in order of time, thereby generating an initial alarm signal sequence (or queue) (step 25). The time mentioned above may be the time when the interface device 13 (or the assignment device 14) receives the alarm signals, or the time when the alarm signals are generated by the alarm devices 11. In another embodiment, the order of the initial alarm signal sequence may be in order of time, but may also be based on predetermined priorities of the alarm devices 11. For example, the alarm device 11 in a specific area may be given predetermined priority.

According to one aspect of the embodiment, the system 100 may include an object detection device 15 (for example, disposed in the control center), coupled to receive the alarm image from the alarm image receiver 132 (of the interface device 13), and performing object detection on the received alarm image (step 26) to determine whether an associated object is detected in the alarm image. For example, the object detection device 15 determines whether a person is detected in the alarm image captured by the burglar alarm device 11A, whether smoke or fire is detected in the alarm image captured by the fire alarm device 11B, or whether water is detected in the alarm image captured by the flood alarm 11C.

The object detection device 15 of the embodiment may perform object detection by a conventional computer vision or image processing technique. In one embodiment, the object detection device 15 adopts a machine learning-based technique to perform object detection according to feature. In another embodiment, the object detection device 15 adopts a deep learning-based technique, such as convolutional neural network (CNN), to perform object detection.

According to another aspect of the embodiment, the assignment device 14 may dynamically modify the initial alarm signal sequence according to an object detection result from the object detection device 15, thereby generating an updated alarm signal sequence (or queue) (step 27). For example, a high treat queue (HTQ) is generated by modifying the FIFO queue. In the embodiment, when the object detection result of the object detection device 15 is positive (that is, an associated object has been detected), the assignment device 14 may assign highest priority to the corresponding alarm signal, and assign other alarm signals from the second-highest priority. Accordingly, the system 100/method 200 may dynamically adjust priorities of alarm signals such that a true alarm may be processed first and a false alarm may be deferred, thereby substantially enhancing overall efficiency of the alarm system.

Figure 3:
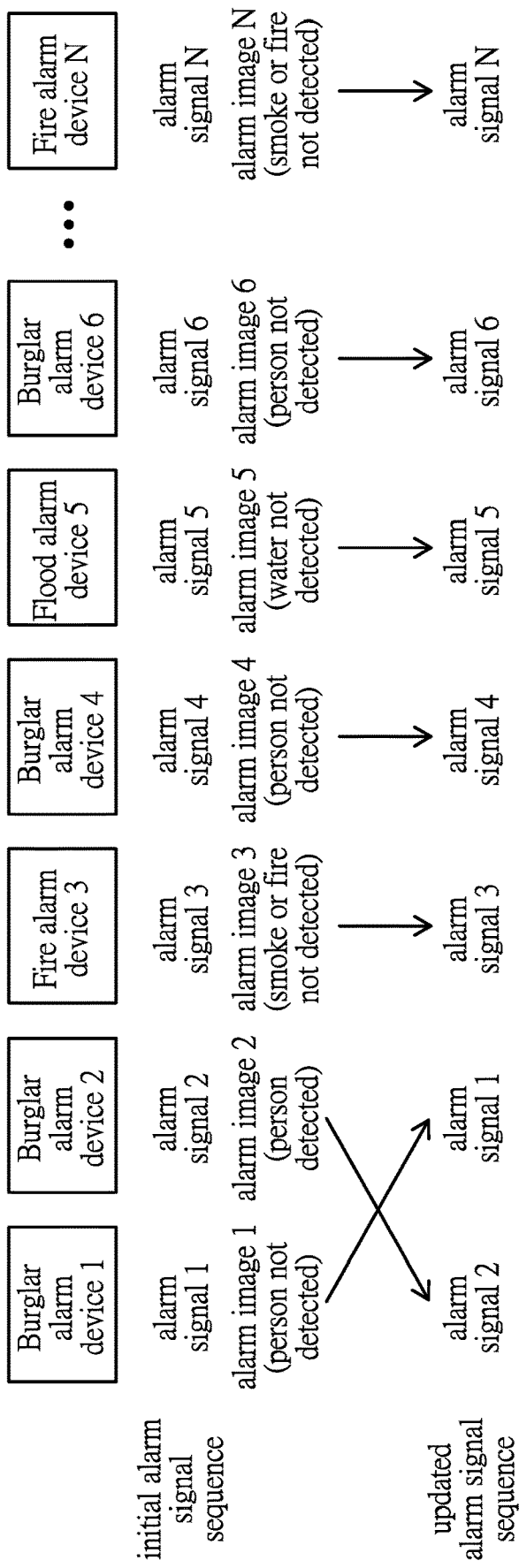
FIG. 3 shows an example of a plurality of alarm devices that transmit alarm signals to a control center in order of time.

FIG. 3 shows an example of a plurality of alarm devices 11A-11C that respectively transmit alarm signals 1 to N to a control center in order of time. Specifically, the assignment device 14 of the control center generates an initial alarm signal sequence according to the alarm signals 1 to N in order of time. Subsequently, the object detection device 15 of the control center performs object detection, and the assignment device 14 dynamically modifies the initial alarm signal sequence according to an object detection result from the object detection device 15, thereby generating an updated alarm signal sequence. In the example, a person is detected in the captured alarm image corresponding to the burglar alarm device 2 (11A), and the assignment device 14 thus re-assigns highest priority to the corresponding alarm signal 2, and re-assign second-highest priority to the alarm signal 1.

Figure 4:
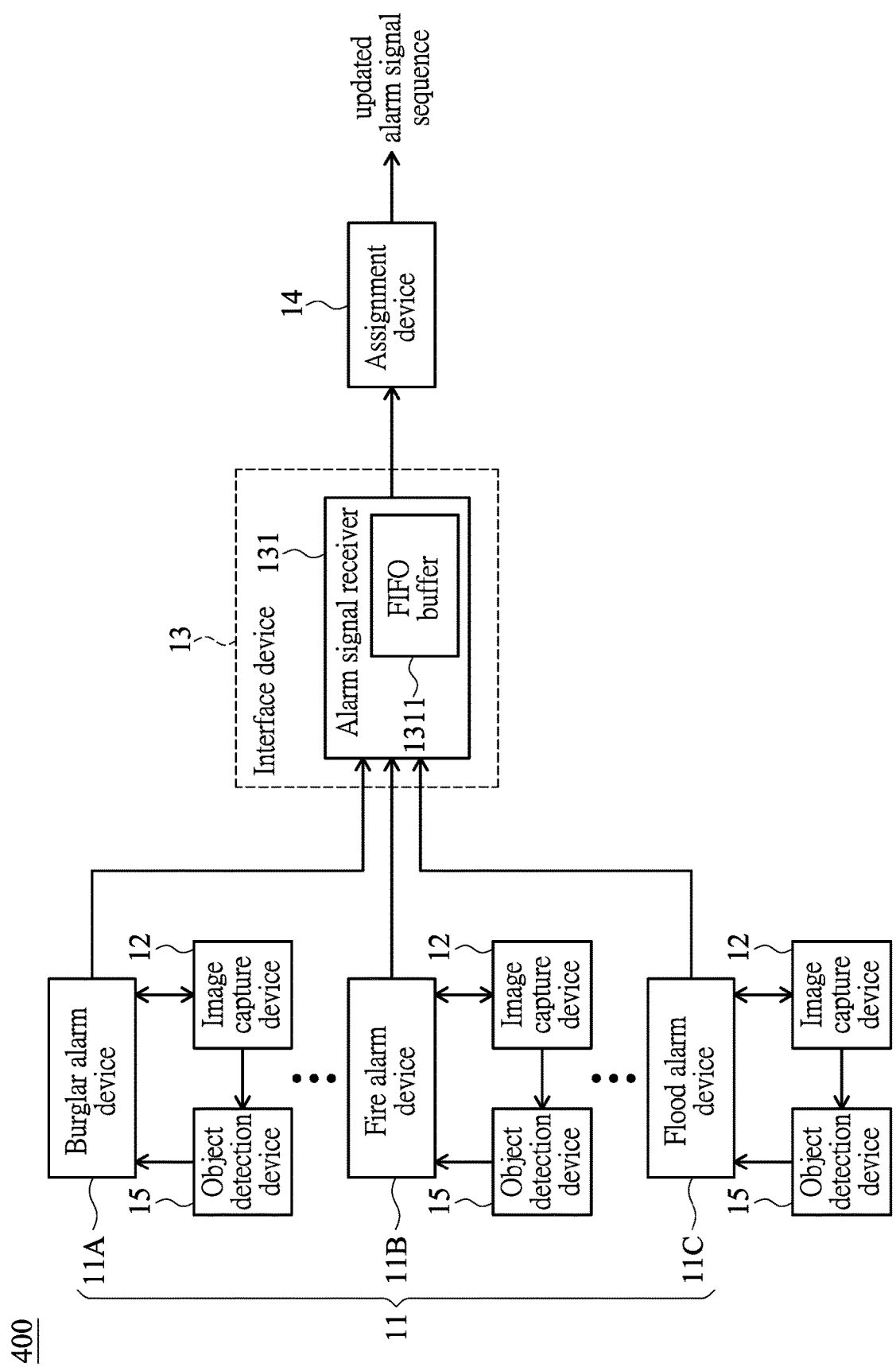
FIG. 4 shows a block diagram illustrating a dynamic alarm priority system according to another embodiment of the present invention.

FIG. 4 shows a block diagram illustrating a dynamic alarm priority system 400 according to another embodiment of the present invention. The dynamic alarm priority system 400 is similar to the system 100 of FIG. 1 with the exception that (local) object detection devices 15 are correspondingly set with the alarm devices 11. When the alarm device 11 is triggered, the corresponding object detection device 15 receives and performs object detection on the alarm image captured by the corresponding image capture device 12. Subsequently, the alarm device 11 transmits the alarm signal and the objection detection result (but not the alarm image) to the interface device 13 (which requires no alarm image receiver 132).

According to a further embodiment (not shown) of the invention, the system 100 of FIG. 1 and the system 400 of FIG. 4 are combined. Specifically, some alarm devices 11 are associated with corresponding object detection devices 15 to perform object detection; while other alarm devices 11 are not associated with corresponding object detection devices 15, in which the object detection is performed by the object detection device 15 of the control center.

Although specific embodiments have been illustrated and described, it will be appreciated by those skilled in the art that various modifications may be made without departing from the scope of the present invention, which is intended to be limited solely by the appended claims.

What is claimed is:

1. A dynamic alarm priority system, comprising:
   plural kinds of alarm devices, an alarm signal being generated when one of the alarm devices is triggered;
   a plurality of image capture devices, correspondingly coupled to the alarm devices respectively, the triggered alarm device activating the corresponding image capture device to capture an alarm image;
   an interface device that receives the alarm signal, wherein the interface device comprises an alarm signal receiver and an alarm image receiver, which receive the alarm signal and the alarm image, respectively, the alarm signal receiver comprising a first-in-first-out (FIFO) buffer for storing the alarm signal;
   an assignment device coupled to receive the alarm signals, which are assigned priorities in order of time, thereby generating an initial alarm signal sequence; and
   an object detection device that performs object detection on the alarm image to determine whether an associated object is detected in the alarm image, wherein the object detection device adopts a deep learning-based technique to perform object detection;
   wherein the assignment device dynamically modifies the initial alarm signal sequence according to an object detection result from the object detection device, thereby generating an updated alarm signal sequence.

2. The system of claim 1, wherein the alarm devices comprise burglar alarm devices, fire alarm device and flood alarm devices.

3. The system of claim 1, wherein the alarm image receiver comprises a database for storing the alarm image.

4. The system of claim 1, wherein the object detection device adopts a machine learning-based technique to perform object detection according to feature.

5. The system of claim 1, wherein the assignment device assigns highest priority to the alarm signal when the associated object is detected in the corresponding alarm image.

6. The system of claim 1, wherein the interface device, the assignment device and the object detection device are disposed inside a control center, and the interface device receives the alarm image.

7. The system of claim 1, wherein the interface device and the assignment device are disposed inside a control center, but the object detection device is disposed outside the control center, and the interface device does not receive the alarm image.

8. A dynamic alarm priority method, comprising:
   providing plural kinds of alarm devices, an alarm signal being generated when one of the alarm devices is triggered;

providing a plurality of image capture devices, correspondingly coupled to the alarm devices respectively, the triggered alarm device activating the corresponding image capture device to capture an alarm image;

receiving the alarm signal and assigning priorities in order of time, thereby generating an initial alarm signal sequence, the alarm signal receiving step being performed using an alarm signal receiver comprising a first-in-first-out (FIFO) buffer for storing the alarm signal;

performing object detection on the alarm image to determine whether an associated object is detected in the alarm image, using an object detection device which adopts a deep learning-based technique to perform object detection; and dynamically modifying the initial alarm signal sequence according to an object detection result, thereby generating an updated alarm signal sequence.

9. The method of claim 8, wherein the alarm devices comprise burglar alarm devices, fire alarm device and flood alarm devices.

10. The method of claim 8, wherein the object detection adopts a machine learning-based technique to perform object detection according to feature.

11. The method of claim 8, wherein highest priority is assigned to the alarm signal when the associated object is detected in the corresponding alarm image.

12. The method of claim 8, wherein the object detection is performed inside a control center, and the control center receives the alarm image.

13. The method of claim 8, wherein the object detection is performed outside a control center, and the control center does not receive the alarm image.

* * * * *